United States Patent
Jarvis et al.

(10) Patent No.: US 8,211,983 B2
(45) Date of Patent: Jul. 3, 2012

(54) POLYMERIC MATERIALS AND ADDITIVES THEREFOR

(75) Inventors: Anthony Jarvis, Wirral (GB); Mark Frost, Derbyshire (GB); Mark Rule, Atlanta, GA (US)

(73) Assignee: Colormatrix Europe Limited (GB)

( * ) Notice: Subject to any disclaimer, the term of this patent is extended or adjusted under 35 U.S.C. 154(b) by 0 days.

(21) Appl. No.: 12/888,099

(22) Filed: Sep. 22, 2010

(65) Prior Publication Data

US 2011/0015325 A1    Jan. 20, 2011

(51) Int. Cl.
  *C08K 3/00* (2006.01)
  *C08K 3/10* (2006.01)
  *C08J 3/20* (2006.01)
  *B29C 49/00* (2006.01)

(52) U.S. Cl. ........ 525/279; 525/503; 524/408; 524/409; 524/410; 524/430; 524/780

(58) Field of Classification Search .................. 528/279, 528/503; 524/408, 409, 410, 430, 780; 525/279, 525/503
See application file for complete search history.

(56) References Cited

U.S. PATENT DOCUMENTS

| | | | | |
|---|---|---|---|---|
| 4,204,865 | A | * | 5/1980 | Kuehnle et al. ................. 430/30 |
| 4,938,569 | A | * | 7/1990 | Tsunoda et al. ............... 349/106 |
| 5,876,636 | A | * | 3/1999 | Schlueter et al. ........... 252/520.1 |
| 6,416,819 | B1 | * | 7/2002 | Chen et al. .................... 427/387 |

FOREIGN PATENT DOCUMENTS

| JP | 06070165 A | * | 3/1994 |
|---|---|---|---|
| JP | 2005200520 A | * | 7/2005 |

* cited by examiner

*Primary Examiner* — Irina S Zemel
(74) *Attorney, Agent, or Firm* — Fay Sharpe LLP

(57) ABSTRACT

A polymer additive for improving the reheat characteristics of a polymer or polymeric composition comprises an inorganic material which is such that a 2.5 mm thick polyethylene terephthalate plaque incorporating the inorganic material has, when tested, an absorption ratio of less than 0.9, wherein the absorption ratio is either the ratio of A1/A2 or the ratio A1/A3, wherein:

A1 is the maximum absorption between 400 nm and 550 nm;
  A2 is the maximum absorption between 700 to 1100 nm;
  A3 is the maximum absorption between 700 to 1600 nm.

Preferred inorganic materials are titanium nitride, indium tin oxide and lanthanum hexaboride.

17 Claims, 2 Drawing Sheets

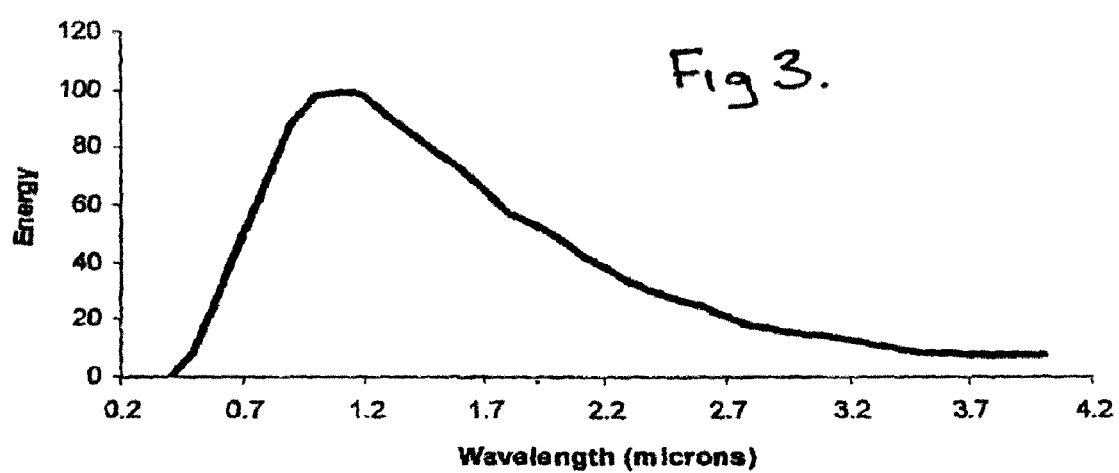

POLYMERIC MATERIALS AND ADDITIVES THEREFOR

This application claims priority from U.S. patent application Ser No. 10/599,403, filed Dec. 21, 2006 now U.S. Pat. No. 7,820,781, which claims the benefit of International Application No. PCT/GB2005/001231, which was published in English on Oct. 13, 2005, the disclosures of which are incorporated herein by reference.

The present invention relates to polymeric materials and additives therefor and particularly, although not exclusively, relates to polymer compositions having improved reheat properties, the use of such compositions, and to a method of production thereof. The invention also concerns a polymer reheat additive which can be used with polymers and which may be useful when applied to thermoplastic polymers, especially those used in the field of container manufacturing.

Polymers are often used in producing preforms (parisons) which are heated with infrared heating lamps prior to being blow-molded into articles, including liquid containers such as beverage bottles and the like. The heat lamps used for reheating polymer preforms (parisons) for the commercial manufacture of liquid containers such as beverage bottles are typically quartz lamps having a broad light emission spectrum from 500 nm to greater than 1500 nm, i.e. infrared heating lamps. Polyester, especially polyethylene terephthalate ("PET"), absorbs poorly in the region between 500 to 1400 nm. Thus, in order to speed up the reheat step in bottle production, or to reduce the amount of energy required for reheat, agents which absorb light in the region between 700 to 1300 nm can be added to the polyester polymer as reheat additives.

A variety of black and grey body absorbing compounds have previously been used as reheat additives to improve the rate of heating characteristics of polyester under infrared heating lamps. These compounds are typically black iron oxide, elemental antimony, black carbon and copper chromite. The term 'black carbon' includes graphite, any form of carbon black, charcoal, activated carbon and the like. However, these materials are inefficient in the forms in which they have been used and high levels of reheat cannot generally be achieved using the materials without the severe darkening of the polymer. Therefore, the amount of absorbing materials which can be added to a polymer is limited by the impact of those materials on polymer visual properties, such as transparency. This is particularly pertinent if the preforms are to be used to manufacture liquid containers such as beverage bottles, especially for use in containing mineral water, where high transparency and an absence of color are considered essential. Transparency is usually represented as "L*" in the CIELAB system, with 100 being the highest and 0 being the darkest. Generally, darker colored reheat additives can be added in only very small quantities because of their negative impact on L*.

It is an object of the present invention to address the above-described problems According to a first aspect of the invention, there is provided a composition for improving the reheat characteristics of a polymeric material, the composition comprising an inorganic material.

According to a second aspect of the invention, there is provided a composition comprising:
  a polymeric material;
  an inorganic material for improving the reheat characteristics of the polymeric material, wherein the inorganic material is such that a 2.5 mm thick polyethylene terephthalate plaque incorporating the inorganic material has, when tested, an absorption ratio of less than 0.9, wherein the absorption ratio is either the ratio of A1/A2 or the ratio A1/A3, wherein:
    A1 is the maximum absorption between 400 nm and 550 nm;
    A2 is the maximum absorption between 700 to 1100 nm;
    A3 is the maximum absorption between 700 to 1600 nm.

Preparation of the 2.5 mm thick plaque for testing inorganic materials and tests may be as described in (A) or (B) below:
  (A) An inorganic material to be tested is thoroughly mixed with dried polymer pellets of a bottle grade PET having an IV of 0.8+/−0.02 and principal monomers pure terephthalic acid and ethylene glycol. An example of such a material is VORIDIAN 9921 referred to hereinafter. Then the mixture is used to prepare 2.5 mm thick plaques using an injection molding machine. Further details on procedure are provided in Examples 22 to 24 hereinafter.
  (B) An inorganic aterial to be tested is added to monomers (e.g. principal monomers pure terephthalic acid and ethylene glycol arranged to produce the aforementioned PET) and the monomers are polymerized. A plaque may subsequently be produced from the polymer prepared as described in (A).

The preferred test is as described in (A).

The ability of an inorganic material to satisfy the requirements of the invention of the second aspect may depend on the chemical identity of the inorganic material and may depend on physical features of the inorganic material such as particle sizes and shapes. In one case, one particular chemical type of inorganic material at a first particle size may not satisfy the test set forth according to the second aspect; however the same chemical type may at a second particle size (which may be smaller than the first particle size) satisfy the test described and may therefore be a useful material for incorporation into a polymeric material to improve the reheat characteristics of the polymeric material.

Suitably, the absorption ratio is less than 0.85. Preferably, the ratio is less than 0.80 and more preferably is less than 0.75.

Suitably, for a selected inorganic material, at least one (preferably both) of the following applies: the absorption ratio A1/A2 is less than 0.70; and/or the absorption ratio A1/A3 is less than 0.90.

Preferably, for a selected inorganic material, at least one (preferably both) of the following applies: the absorption ratio A1/A2 is less than 0.65; and/or the absorption ratio A1/A3 is less than 0.85.

More preferably, for a selected inorganic material, at least one (preferably both) of the following applies: the absorption ratio A1/A2 is less than 0.60; and/or the absorption ratio A1/A3 is less than 0.80.

In an especially preferred embodiment, for a selected inorganic material, at least one (preferably both) of the following applies: the absorption ratio A1/A2 is less than 0.50; and/or the absorption ratio A1/A3 is less than 0.80.

Suitably, a selected inorganic material has an absorption ratio of A1/A2 of less than 0.80, preferably less than 0.70, more preferably less than 0.60, especially less than 0.56.

The absorption ratios A1/A2 and A1/A3 may each be greater than 0.2.

According to a third aspect of the invention, there is provided the use of an inorganic material as described according to the first or second aspects for improving the reheat characteristics of a polymeric material.

According to a fourth aspect of the invention, there is provided a concentrated formulation for addition to a polymeric material or to one or more monomers arranged to be polymerized to prepare a polymeric material, said formulation comprising a carrier and an inorganic material as described according to the first or second aspects.

The formulation may include a carrier which is a solid at standard temperature and pressure (STP) or may comprise a liquid carrier. When the carrier is a solid, the formulation is suitably a masterbatch. When the carrier is a liquid, the inorganic material may be dissolved or, more preferably, dispersed in the liquid.

Preferably, the formulation includes less than 90 wt % of inorganic materials which are as described according to the first or second aspects. Preferably, the sum of the wt % of all inorganic materials in the formulation is less than 90 wt %, more preferably less than 75 wt %, especially less than 40 wt %. Preferably, the sum of the wt % of all particulate material (including said inorganic materials) in said formulation is less than 90 wt %, ore preferably less than 75 wt %, especially less than 40 wt %. Said formulation preferably includes at least 0.0005 wt %, preferably at least 0.001 wt %, of inorganic materials which are as described according to the first or second aspects.

When said concentrated formulation comprises a solid masterbatch, the sum of the wt % of inorganic materials which are as described according to the first or second aspects may be up to 90 wt %, up to 50 wt % or up to 40 wt %.

When said concentrated formulation comprises a liquid, for example a liquid dispersion comprising said inorganic material, the sum of the wt % of inorganic materials which are as described according to the first or second aspects may be up to 90 wt %, up to 50 wt % or up to 40 wt %.

A liquid carrier may be a vegetable or mineral oil or a glycol. A particularly preferred glycol is ethylene glycol, especially if the particles of inorganic material are to be added to a PET polymerization reaction mixture. It may also be advantageous if the inorganic material is milled in the liquid carrier. Milling serves to break down any agglomerates present into primary particles.

Other components such as surfactants, thickening and stabilizing agents may be added to improve dispersion in the liquid carrier.

Other polymer additives may also be included in a liquid carrier such as slip property modifiers, acetaldehyde removing agents, IV modifiers, barrier agents such as Amosorb®, flame retardancy agents, surface finish modifiers, conductivity modifiers and colors.

According to a fifth aspect of the invention, there is provided a method of improving the reheat characteristics of a polymeric material, the method comprising contacting the polymeric material or contacting one or more monomers arranged to be polymerized to prepare the polymeric material with an inorganic aterial as described according to the first or second aspects or otherwise as described herein.

The polymeric material or said monomers may be contacted with a powder which comprises or consists essentially of said inorganic material; or may be contacted with a concentrated formulation as described according to the fourth aspect.

Whichever method is used to contact said polymeric material and said inorganic material, it is preferred that sufficient of said inorganic material is added so that at least 0.01 ppm, suitably at least 0.1 ppm, preferably at least 1 ppm, more preferably at least 2 ppm, even more preferably at least 3 ppm, especially at least 4 ppm, based on the weight of said polymeric material, is present in the polymeric material contacted with inorganic material or is present in a polymeric material preparable from monomers arranged to be polymerized to prepare said polymeric material. Suitably, less than 1000 ppm, preferably less than 500 ppm of said inorganic material is present in said polymeric material.

The ratio of the weight of polymeric material (or the weight of monomers arranged to be polymerized to prepare the polymeric material) to the weight of said inorganic material which contacts said polymeric material (or monomers) is suitably in the range $10^3$ to $10^6$, preferably in the range $2 \times 10^3$ to $2.5 \times 10^5$.

Contacting one or more monomers with an inorganic material as described may be a convenient way of incorporating the inorganic material, since it may then be easily mixed into the monomers and/or polymer in downstream steps for reacting/processing the monomers and/or the polymer. Suitably, the inorganic material is incorporated into an alcohol-group containing monomer stream if the polymeric material is a PET.

The method of the fifth aspect may include making granules or pellets which comprise the polymeric material and inorganic material.

According to a sixth aspect of the invention, there is provided a polymer reheat additive comprising an inorganic material having greater intrinsic absorptivity in the infra-red region of the spectrum (between 700 and 1400 nm) than in the visible region of the light spectrum (between 400 and 700 nm).

According to a seventh aspect of the invention there is provided a polymer reheat additive comprising an inorganic material having at least one absorption maximum in the infra red region of the spectrum (between 700 and 1400 nm) which is greater than any absorption maximum in the visible region of the spectrum (between 400 and 700 nm).

The invention also provides a thermoplastic molding composition comprising a reheat additive as described herein. Also provided in accordance with the invention is a molded article formed from such a molding composition. molding may be undertaken by thermoforming or injection molding.

In one embodiment, the inorganic material may be a material other than any form of black carbon, metallic antimony, iron oxide or copper chromite.

It has been discovered that certain inorganic materials can be useful in reheat applications. Particular inorganic materials and certain of their physical and/or chemical characteristics are described herein. Preferably, the inorganic materials absorb light in the infra red region, are compatible with thermoplastic molding compositions, are non-toxic and have an aesthetically neutral or positive impact on the color of a molded article formed from a composition to which they are added.

According to an eighth aspect of the invention, there is provided a thermoplastic molding composition comprising a polyester, and at least one reheat additive comprising an inorganic material other than any form of black carbon, metallic antimony, iron oxide or copper chromite, the reheat additive being present in the composition in an amount effective to absorb light in the infra red region and thus reduce the energy requirement for reheating to a blow molding temperature an article molded from the composition.

Additives and/or a selected inorganic materials described herein may allow a polymer to have an improved reheat characteristic, wherein the polymer reheats and therefore attains a temperature above its glass transition temperature quicker and, consequently, reheat times may be reduced and productivity increased. The additives described may therefore allow for more efficient handling of the polymer.

The polymer may comprise polymer particles, with the additive dispersed throughout the polymer particles. Alternatively, the polymer may be a solid or fragmented with the additive disposed within the polymer. The additive may comprise colloids or particles, but will preferably comprise nanoparticles. Nanoparticles may comprise particles with an average particle diameter less than 1 micron, preferably less than 100 nm.

Inorganic materials referred to herein may be stoichiometric or non-stoichiometric (when such forms can exist); non stoichiometric forms may be preferred.

One class of inorganic materials (referred to herein as Type 1) which may be used for improving the reheat characteristics may comprise materials which intrinsically exhibit greater absorptivity between 700 and 1400 nm than between 400 and 700 nm. Absorptivity may be calculated by measuring the absorbance of a polyester plaque containing the material at 400, 700 and 1100 nm and then determining the percentage change in absorption that occurs between 400 and 700 nm and then 700 to 1100 nm. Plaques incorporating preferred inorganic materials have a % absorptivity in the region 700 to 1100 nm which is greater than the % absorptivity in the region 400 to 700 nm and is positive in value. A particularly preferred example of such an inorganic material is reduced indium tin oxide. Intrinsic absorptivity, as used herein may be taken to be the absorbance exhibited by a particle of the said material when the particle size is sufficiently small that a significant amount of the impinging light is transmitted at every wavelength.

A second class of inorganic materials (referred to herein as Type 2) which may be used for improving the reheat characteristics may comprise materials which have a greater absorption maximum in the region between 700 to 1400 nm than the average absorption between 400 and 700 nm. The absorption can be that directly measured by a spectrophotometer. A particularly preferred example of such an inorganic material is titanium nitride.

Preferably, the additive and/or an inorganic material described herein may be capable of increasing energy absorption of a polymeric material in the near-infra red light range (700 to approximately at least 1400 nm). More preferably, the additive and/or a selected inorganic material may be capable of increasing energy absorption of the polymer in the near-infra red light range more than it does in the visible light range (400 and 700 nm). Preferably, the selected inorganic material exhibits a greater absorptivity in the region between 700 and 1400 nm than between 400 and 700 nm of at least 10%, more preferably at least 25%, and much more preferably at least 50% and yet more preferably still at least 100%.

It is preferred that the additive and/or a selected inorganic material has an average energy absorption maximum in the range of 700 to 1400 nm which is greater than the average energy absorption in the range of 400 and 700 nm. Suitably, the average energy absorption maximum in the region between 700 to 1400 nm which is greater than the average absorption in the region between 400 to 700 nm is at least 1% greater, preferably is at least 5% greater and more preferably is at least 10% greater. It is most preferable that the average absorption maximum is at least 50% greater.

If particles of an inorganic material selected as described herein are too large, they may absorb all of the impinging light in both the visible and infrared portions of the spectrum, and may therefore provide no preferential absorption of infrared radiation. As the particle size is reduced, the relative absorption difference between the visible and infrared portions of the spectrum may increase until the intrinsic absorptivity is achieved. Hence, selection of the preferred particle size for a said inorganic material may be dependent on the specific absorptivity of an inorganic material in the visible and infrared portions of the electromagnetic spectrum.

The average (suitably the number average) particle size of additive and/or selected inorganic material which may be used to increase the absorption of energy between 700 and 1400 nm may be less than 10 microns, preferably less than 1 micron and more preferably less than 100 nm.

Suitably at least 90%, (preferably at least 95%, more preferably at least 99%, especially about 100%) of the particles of said additive and/or inorganic material have a maximum dimension which is less than 10 microns, preferably less than 1 micron, more preferably less than 500 nm, especially less than 100 nm.

In one embodiment, the inorganic material may be of such a particle size that, when incorporated into a polymeric material, it is substantially optically invisible. For example, substantially all of the particles of the inorganic material may have a particle size which is below the critical wavelength of visible light.

In one embodiment, the additive and/or selected inorganic material may have even or flat absorption characteristics across the visible region of the spectrum with negligible absorption minima and maxima. This may be desirable if a neutral or un-colored plastics material is required, e.g. for mineral water bottles. In another embodiment, the additive and/or selected inorganic material may have uneven or slanted absorption characteristics across the visible region of the spectrum possessing significant absorption minima or maxima. This may be desirable for the production of colored bottles. An additive which may impart a blue color to a polymeric material, for example a plaque or preform may be especially desirable as it can act not only to improve the reheat profile of the polymeric material, but also to color the resulting plastics material. Polymers, particularly polyesters such as poly(ethylene terephthalate), are known to yellow upon exposure to elevated temperatures. Indeed poly(ethylene terephthalate) yellows as it is being manufactured. In some cases, a toner may be added to the polyester to adjust its color from a yellow back to a neutral shade. These toners are thus usually colorants that impart a blue shade, a typical example being cobalt acetate. Therefore, additives and/or inorganic materials which impart a blue shade to a polymeric material, for example plaque or perform, may also make good toners and may be especially desirable. However, additives and/or inorganic materials which give rise to other visual colors can also be used as when used in conjunction with a complimentary colored toning agent, usually a traditional colorant, a neutral shade can easily be achieved.

Preferred inorganic materials may have absorption/absorptivity characteristics as described in any statement herein and, additionally, may have an absorption at 475 nm which is less than the absorption at 700 nm. The absorption at 475 nm is preferably less than the absorption at both 600 nm and 700 nm. The absorption at 475 nm is more preferably less than the absorption at each of 550 nm, 600 nm and 700 nm. The absorption at 475 nm is most preferably less than the absorption at each of 400 nm, 550 nm, 600 nm and 700 nm.

A particularly preferred inorganic aterial for use as described herein comprises titanium nitride. Advantageously, this imparts a blue color having an absorption minimum in the visible region around 475 nm.

A reheat additive as described herein may be produced from a number of inorganic materials. Said reheat additive and/or said inorganic material described herein may be selected from one or more of the following group of materials: elemental metals, metalloids, oxides, doped oxides, mixed oxides, nitrides, silicides or boride compounds. Preferably, said reheat additive and/or said inorganic material is selected from one or more of the following group of materials: titanium nitride, zirconium nitride, indium tin oxide, reduced indium tin oxide, antimony tin oxide, gold, silver, molybdenum or tantalum.

A composition and/or reheat additive described herein may further comprise one or more additional materials to assist reheat characteristics of the polymeric materials. Additionally or alternately, a composition and/or additive may further comprise one or more additional materials to influence the characteristics of a polymeric material. For example, one or more black or grey body infrared absorbing materials may be incorporated with the additive which can result in the absorption of more near-infrared radiation greater than 700 nm. Such black body or grey body infrared absorbing material may comprise black carbon, iron oxides, copper chromite or metallic antimony formed by the reduction of antimony trioxide during the polymerisation reaction. Other materials may include colorants etc. A composition and/or reheat additive may be used in conjunction with organic materials, such as near-infrared dyes, which have an absorption maximum in the region 700 to 1400 nm.

Whilst the test referred to in accordance with the second aspect is conveniently undertaken a polyethylene terephthalate plaque, inorganic materials which pass the test may be incorporated into any type of polymeric material for improving its reheat characteristics, for example when infra red lamps are used.

The polymeric material can essentially be any polymer which is used to produce a plastics material, but preferably, the polymer comprises a thermoplastic polymer (including both polymers which are synthetic or natural). Preferred thermoplastic polymers are ones usable/used for injection molding of articles such as container preforms and the like. Preferably, the thermoplastic polymer is selected from one or more of the following groups of polymers: polyesters, polycarbonates, polyamides, polyolefins, polystyrenes, vinyl polymers, acrylic polymers and copolymers and blends thereof. Preferred polymers are polyesters, polypropylene and oriented polypropylene which may suitably be used to produce containers. Especially preferred polymers are polyesters as used to make liquid containers and particularly beverage bottles such as poly(ethylene terephthalate) or a copolymer thereof. A composition comprising a polymer with an additive and/or a said inorganic material as described can be used in producing preforms such as container preforms before the preforms are heated or inserted into a stretch-blow molding machine.

Polyethylene terephthalate used for injection molding purposes is typically post-condensed and has a molecular weight in the region of about 25,000 to 30,000. However, it has also been proposed to use a fibre grade polyethylene terephthalate which is cheaper but is non-post-condensed, with a lower molecular weight in the region of about 20,000. It has further been suggested to use copolyesters of polyethylene terephthalate which contain repeat units from at least 85 mole % terephthalic acid and at least 85 mole % of ethylene glycol. Dicarboxylic acids which can be included, along with terephthalic acid, are exemplified by phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid and sebacic acid. Other diols which may be incorporated in the copolyesters, in addition to ethylene glycol, include diethylene glycol, triethylene glycol, 1,4-cyclohexanedimethanol, propane-1,3-diol, butane-1,4-diol, pentane-1,5-diol, hexane-1,6-diol, 3-ethylpentane-2,4-diol, 2-methyl pentane 1,4-diol, 2,2,4-trimethylpentane-1,3-diol, 2-ethylhexane-1,3-diol, 2,2-diethylpropane-1,3-diol, hexane-1,3-diol, 1,4-di(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. In this specification the term "polyethylene terephthalate" includes not only polyethylene terephthalate but also such copolyesters.

Injection molding of polyethylene terephthalate and other polyester molding compositions is typically carried out using an injection molding machine and a maximum barrel temperature in the range of from about 260° C. to about 285° C. or more, for example, up to about 310° C. The dwell time at this maxim temperature is typically in the range of from about 15 seconds to about 5 minutes or more, preferably from about 30 seconds to about 2 minutes.

In a preferred embodiment of the present invention, the additive and/or inorganic material is capable of increasing the percentage of reheat per unit of lightness lost ratio compared to an equivalent preform made from a polymer containing a traditional black or grey body absorbing agent such as any form of black carbon or metallic antimony formed by the reduction of antimony trioxide.

In a method as described according to the fifth aspect, said inorganic material is preferably other than black carbon, metallic antimony, iron oxide or copper chromite.

The method of the fifth aspect may utilize an additive and/or inorganic material as herein described. Polymers containing the additive will be particularly suited for use in injection molding of articles. Furthermore, the additive may be dispersed in a liquid. Should the additive be dispersed in a liquid then the liquid can be applied to the polymer at the polymerization stage or the injection molding stage. Such an article could potentially be any article which can be injection molded. Preferably, the article is a preform that can then be stretch-blow molded into a liquid container such as beverage bottles using infrared heating lamps.

The invention extends to a product comprising a polymeric material and an inorganic material as described herein, for example in accordance with the first second aspects.

Said product may include at least 0.01 ppm, suitably at least 0.1 ppm, preferably at least 1 ppm, more preferably at least 2 ppm, even more preferably at least 3 ppm, especially at least 4 ppm, based on the weight of said polymeric material in said product. Suitably, said product includes less than 1000 ppm, preferably less than 500 ppm of said inorganic material based on the weight of said polymeric material.

In said product, the ratio of the weight of polymeric material to the weight of said inorganic material is suitably in the range $10^3$ to $10^6$ preferably in the range $2 \times 10^3$ to $2.5 \times 10^5$.

The product may be in the form of pellets or granules.

The product may be a molded article. In this case, it may be a perform, for example for a container and/or a container per se. A preferred container is a bottle.

The invention extends to a method of making a product, the method comprising heating a composition comprising a polymeric material and an inorganic material as described herein, for example in accordance with the first or second aspects, and forming the composition into a shape to define the product.

The method may include an injection molding process, for example to make container performs.

In the method of making said product, the composition is preferably heated using an infra red source, for example one or more infra red heating lamps.

In accordance with a further aspect of the present invention, there is provided an article made from a polymer containing an additive of inorganic material which intrinsically exhibits greater absorptivity between 700 and 1400 nm than between 400 and 700 nm. In yet another aspect of the present invention, there is provided an article made from a polymer containing the additive of inorganic material that has a greater absorption maximum in the region between 700 to 1400 nm than the average absorption between 400 and 700 nm. A particularly preferred article may be a container preform. An especially preferred container preform is one which can be heated with infrared heating lamps prior to being stretch-blow molded into a liquid container such as a beverage bottle. The types of beverage such bottle can contain includes but is not limited to beer, fruit juice, carbonated and still mineral water and other carbonated soft drinks.

In accordance with yet a further aspect of the present invention, there is provided a method of increasing the reheat characteristics of a polymer, comprising the incorporation into the polymer particles of at least one inorganic material, such that the polymer has a greater % reheat per unit of lightness lost ratio than an equivalent polymer containing a traditional black or grey body absorbing agent such as black carbon or metallic antimony formed by the reduction of antimony trioxide or iron oxide or copper chromite.

An additional aspect of the present invention provides for the use of an inorganic material (not being black carbon, a metallic antimony, iron oxide or copper chromite) to improve the reheat properties of a polymer or polymeric composition.

In yet a further aspect of the present invention, there is provided a molded article formed from a polymer or polymeric composition mixed with an inorganic additive (not being black carbon, metallic antimony, iron oxide or copper chromite).

In a number of the aspects of the invention, the inorganic material/additive may be selected from one or more of the following group of materials: titanium nitride, zirconium nitride, indium tin oxide, reduced indium tin oxide, antimony tin oxide, gold, silver, molybdenum or tantalum. The inorganic material/additive is preferably a nanoparticle having an average particle size less than 1 micron. Preferably, the average particle size of the inorganic material/additive is 100 nm or less. The polymer or polymeric composition is preferably selected from one or more of the following group of polymers: polyesters, polycarbonates, polyamides, polyolefins, polystyrenes, vinyl polymers, acrylic polymers and copolymers and blends thereof. The article produced from a polymer comprising the polymer and inorganic material/additive is preferably injection molded. Where the article is a container perform, said preform is preferably used in a stretch-blow molding process requiring a heating step with infrared heating lamps, to produce bottles suitable for use in containing liquids such as beverages.

The invention will now be illustrated by way of example only with reference to the figures and the following examples, in which:

FIG. 1 illustrates the effect that an additive has on a polymer by means of transmission spectrum. The Figure shows 60 nm particles of titanium nitride (TiN) in PET, and for comparison the transmission spectrum for the commercially available reheat polymer CB11e (Voridian) which contains a prior art infrared absorbing additive. Also shown is the transmission spectrum of a PET polymer (9921W) which does not contain an infrared-absorbing reheat additive.

FIG. 3 illustrates the spectral energy distribution of Philips IRK halogen infrared heating lamps.

EXAMPLES

Figure 1:
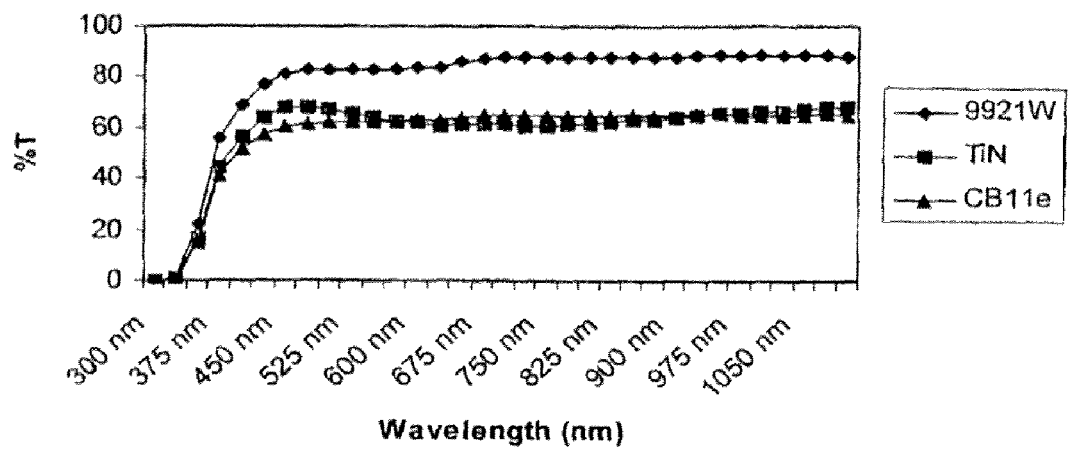
Figure 2:
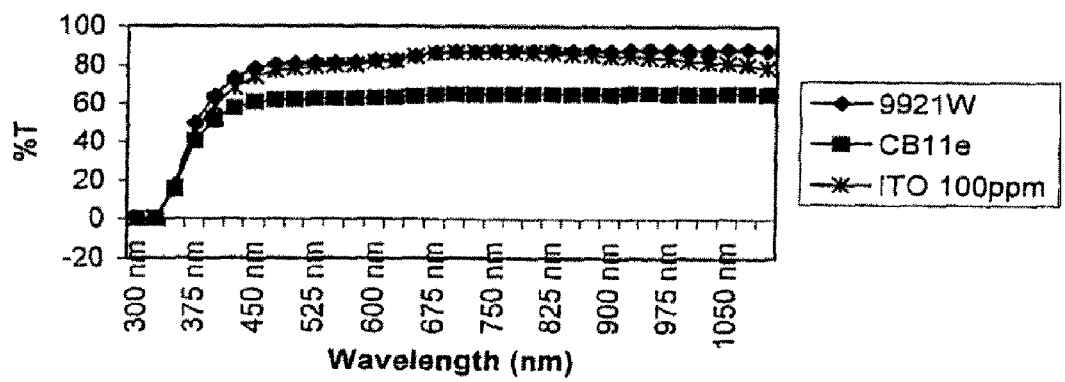
FIG. 2 shows the transmission spectrum for an additive comprising 40 nm particles of reduced indium tin oxide. Such a material exhibits greater absorptivity in the infrared compared to the visible spectrum.

Preforms were made using a 160-ton HUSKY injection molding machine which made two preforms per shot. Each preform weighed approximately 34 grams and was cylindrical, approximately 130 mm in length with a screw top base. These preforms could be blown into one-liter bottles with a petaloid base.

Polyester injection molding took place at 270° C. General purpose poly(styrene) injection molding took place at 200° C.

The polymers used were:
B60 (DuPontSA)—a commercial, bottle grade resin PET resin, toned and non-reheat.
Untoned B60 (DuPontSA) the same as B60 but without any toning therefore showing the natural yellow color of the resin.
9921W (Voridian)—a commercial, bottle grade resin PET resin, toned and non-reheat.
Laser+ (DuPontSA)—a commercial bottle grade reheat resin.
CB11e (Voridian)—a commercial bottle grade reheat resin.
General purpose poly(styrene) (GPS).
CB11e and Laser+ are both reheat resins containing metallic antimony as the reheat aid. CB11e has approximately twice the reheat but has approximately twice the reduction in lightness as Laser+.

Where the inorganic particle compound was milled milling took place as follows: The inorganic particle compound (5 g) was stirred into an oil known to those skilled in the art to be compatible with the polymer the inorganic particles are to be incorporated into (total mass of oil and particle mixture=50 g). The oil and particle mixture was then transferred to a 100 ml glass jar approximately 55% filled with small glass beads (1.2 mm diameter). The glass jar as shaken at 600 shakes per minute on a Red-Devil paint shaker. The milled dispersion was used immediately.

The following inorganic particle compounds were used as reheat aids.
1. Titanium nitride, average primary particle size 60 nm and 30 nm, supplied by Neomat of Riga, Latvia.
2. Reduced indium tin oxide, average primary particle size less than 40 nm, was supplied by NanoProducts Corp. Longmont, Co., USA.
3. Antimony tin oxide, average primary article size of 30 nm was supplied by NanoPhase Technologies, Romeoville, Ill., USA.
4. Lanthanum hexaboride nanopowder, average primary particle size less than 40 nm, was supplied by NanoProducts Corp. Longmont Co., USA.
5. Cobalt silicide ($CoSi_2$) powder of average particle size 1000 nm was supplied by Alfa-Aesar.

The near infrared dye employed was supplied by ADS Dyes, Toronto, Canada. The Lamp Black 101 (carbon black) was supplied by Degussa. Sigma-Aldrich supplied all other materials.

The particles of inorganic materials were mixed into the pre-made polymer pellets by placing the powder or liquid dispersion of particles of inorganic material into a bucket fitted with a lid containing the hot, dried polymer pellets and then shaking the bucket by hand to mix the two together. The polymer pellets and particles of inorganic material mixture were then immediately used to make preforms by an injection molding process.

1. Preforms

Example 1

TiN milled 60 nm at 25 ppm in B60 resin.

Example 1a

TiN milled 60 nm at 25 ppm in 9921W resin.

Example 1b

TiN milled 30 nm at 25 ppm in 9921W resin.

Example 2

TiN milled at 5 ppm in untoned B60 resin.

Example 3

TiN milled at 10 ppm in untoned B60 resin.

Example 4

$LaB_6$ powder at 100 ppm in B60 resin.

Example 5

$LaB_6$ milled at 100 ppm in B60 resin.

Example 6

ITO powder at 100 ppm in B60 resin.

Example 6a

ITO powder at 100 ppm in 9921W resin.

Example 7

ITO milled resin at 100 ppm in 860 resin.

Example 8

ATO powder at 463 ppm in B60 resin.

Example 9

ATO milled at 100 ppm in B60 resin.

Example 10

TiN milled at 10 ppm and ITO milled at 10 ppm in untoned B60 resin.

Example 11

TiN milled at 10 ppm and near-infrared organic dye at 50 ppm in untoned 860 resin.

Example 12

TiN milled at 10 pm and tantalum nanopowder at 100 ppm in untoned 860.

Example 13

TiN milled at 5 ppm and ITO milled at 75 ppm in untoned B60 resin.

Example 14

TiN milled at 10 ppm and ITO milled at 50 ppm in untoned 1360 resin.

Example 15

Mo nanosized powder at 250 ppm into B60 resin.

Example 16

Cobalt silicide at 100 ppm into B60 resin.

Example 17

ITO milled at 100 ppm in GPS.

Example 18

TiN milled at 25 ppm in GPS.

The colors of the preforms were measured using a Minolta cm-3700d spectrophotometer ($D_{65}$ illumination, 10° observer, specular included, UV included) linked to an IBM compatible PC.

The preform reheat tests were performed by measuring the room temperature-temperature of a preform using a Raytek MiniTemp laser digital infrared thermometer and then placing it into a stretch blow-molding bottle machine with a single preform fitting, with all nine Philips IRK halogen infrared heating lamps set to 75% power. The preforms were heated for 35 seconds after which time the temperature of the preform was recorded. The spectral energy distribution of the lamps fitted into this machine is displayed in FIG. 3. The temperature difference (temperature after 35 seconds of heating minus the room temperature-temperature of the preform) was then used to calculate % change in reheat relative to non-reheat control (either B60 or untoned B60).

Example 19

Formulation of inorganic particles in ethylene glycol suitable for adding directly to a polyester polymerization reaction.

Reduced indium tin oxide (5 g) or titanium nitride (5 g) was stirred into ethylene glycol (up to 50 g) and added to a glass jar 50% filled with small glass milling beads (~1.2 mm in diameter). The jar was sample was milled by shaking it on the Red-Devil paint shaker at 600 s.p.m. for 10 minutes. The sample was then ready for adding directly to a polyester polymerization reaction mixture.

Results

1. Preform Colors

|  | L | a | b | C | h° |
|---|---|---|---|---|---|
| B60 | 78.96 | −0.69 | 1.61 | 1.75 | 113.3 |
| Untoned B60 | 80.82 | −0.47 | 3.25 | 3.28 | 98.2 |
| 9921W | 77.19 | −0.89 | 4.52 | 4.6 | 101.2 |
| Laser+ | 70.25 | −0.27 | 0.84 | 0.88 | 107.6 |
| CB11e | 60.54 | −0.96 | 2.66 | 2.83 | 109.9 |
| Example 1 | 64.03 | −3.33 | −4.10 | 5.29 | 230.9 |
| Example 1a | 63.12 | −2.89 | −3.87 | 5.01 | 215.3 |
| Example 1b | 54.47 | −4.51 | −7.20 | 8.50 | 237.9 |

-continued

|  | L | a | b | C | h° |
|---|---|---|---|---|---|
| Example 2 | 77.40 | −1.15 | 0.96 | 1.50 | 140.2 |
| Example 3 | 73.62 | −1.89 | −0.37 | 1.93 | 191.0 |
| Example 4 | 70.64 | −0.46 | 7.33 | 7.34 | 93.6 |
| Example 5 | 67.88 | −1.67 | 6.69 | 6.89 | 104.1 |
| Example 6 | 76.63 | −0.60 | 6.56 | 6.59 | 95.2 |
| Example 6a | 74.89 | −0.59 | 8.35 | 8.37 | 94.0 |
| Example 7 | 76.46 | −0.67 | 8.82 | 8.84 | 94.4 |
| Example 8 | 63.83 | 0.95 | 14.3 | 14.3 | 86.2 |
| Example 9 | 75.85 | −0.78 | 6.76 | 6.80 | 96.55 |
| Example 10 | 73.66 | −1.86 | 0.07 | 1.86 | 117.9 |
| Example 11 | 69.78 | −5.02 | 13.51 | 14.4 | 110.4 |
| Example 12 | 66.48 | −1.34 | 0.50 | 1.43 | 159.4 |
| Example 13 | 74.32 | −1.22 | 5.57 | 5.70 | 102.3 |
| Example 14 | 72.44 | −1.84 | 1.74 | 2.54 | 136.7 |
| Example 15 | 66.22 | −0.57 | 1.10 | 1.24 | 117.3 |
| Example 16 | 76.08 | −1.08 | 3.20 | 3.38 | 108.7 |
| GPS | 85.50 | −0.08 | 0.68 | 0.68 | 96.92 |
| Example 17 | 83.43 | −0.20 | 4.31 | 4.31 | 92.7 |
| Example 18 | 71.62 | −2.03 | −5.22 | 5.60 | 248.7 |

2. Reheat Versus Lightness

|  | % Reheat | % Reheat/Unit of lightness lost |
|---|---|---|
| B60 | 0 | 0 |
| Untoned B60 | 0 | 0 |
| 9921W | 0 | 0 |
| GPS | 0 | 0 |
| Laser+ | 7.5 | 0.80 |
| CB11e | 17.0 | 0.92 |
| Example 1 | 16.8 | 1.05 |
| Example 1a | 16.9 | 1.20 |
| Example 1b | 22.3 | 0.91 |
| Example 2 | 18.0 | 0.99 |
| Example 3 | 5.4 | 0.74 |
| Example 4 | 14.0 | 0.61 |
| Example 5 | 15 | 1.35 |
| Example 6 | 16.9 | 6.76 |
| Example 6a | 17.0 | 7.39 |
| Example 7 | 18.1 | 7.24 |
| Example 8 | 17.9 | 1.18 |
| Example 9 | 2.0 | 0.64 |
| Example 10 | 9.6 | 1.32 |
| Example 11 | 10.3 | 0.92 |
| Example 12 | 11.2 | 0.78 |
| Example 13 | 17.1 | 2.71 |
| Example 14 | 16.9 | 2.13 |
| Example 15 | 16.5 | 1.30 |
| Example 16 | 5.7 | 1.11 |
| Example 17 | 18.2 | 8.79 |
| Example 18 | 12.7 | 0.91 |

In every case the inorganic material reheat aid system has been able to increase the % reheat of the control resin it was incorporated into and as heating was for a fixed time of 35 seconds thus the rate of reheat was increased. Indeed in several instances not only was there an increase in reheat over the control but the % reheat per unit of lightness lost ratio was higher than the preforms made from both of the two commercial reheat resins. This gave rise to preforms with the same reheat as the two commercial reheat standard but a higher lightness value thus making them desirable for use by the mineral water bottle industry.

Example 20

Type One Inorganic Materials—Absorptivity Determination

Absorptivity was determined by measuring the absorbance of plaques containing the particles of inorganic material as follows.

Plaques were prepared using a 22-ton BOY injection molding machine that produces plaques measuring 75×50 mm, of two thicknesses, 2 and 2.5 mm.

Plaques were prepared comprising 9921W containing reduced indium tin oxide (powder) at 100 ppm. Control, CB11e and Laser+plaques were also prepared.

The spectrum of the plaques in the region 300 to 1100 nm was measured using a Perkin-Elmer Lambda 35 uv-vis spectrophotometer linked to an IBM compatible PC.

Absorptivity was then calculated by determining the % change in measured absorbance that occurs across the visible region 400 to 700 nm, and then in the near infrared region 700 to 1100 nm. This was perform as follows:

$$((Abs_{\lambda 2}-Abs_{\lambda 1})/Abs_{\lambda 1})*100$$

Where Abs 1 and 2 are the absorption at either 400, 700 or 1100 nm with $\lambda 2$ always being greater than $\lambda 1$, i.e. when $\lambda 1=400$ nm then $\lambda 2=700$ nm and when $\lambda 1=700$ nm then $\lambda 2=1100$ nm.

|  | Absorptivity % $_{400\ to\ 700\ nm}$ | Absorptivity % $_{700\ to\ 1100\ nm}$ |
|---|---|---|
| 9921W | −67 | −13 |
| Laser+ | −33 | 0.00 |
| CB11e | −35 | −1 |
| ITO | −72 | +45 |

Example 21

Type Two Inorganic Materials—Absorbance Measurement

A plaque of 9921W was prepared containing TiN (30 nm at 15 ppm) as above.

The plaques were used to generate spectrophotometer data. The average absorbance over the range 400 to 700 nm and the maximum absorbance in the range 700 to 1100 nm was determined. The % difference between the two was calculated.

|  | 700-1100 max | 400-700 ave | diff. | % diff |
|---|---|---|---|---|
| 9921W | 0.0661 | 0.103031 | −0.03693 | −35 |
| Laser+ | 0.1202 | 0.137931 | −0.01773 | −13 |
| CB11e | 0.1877 | 0.212215 | −0.02452 | −12 |
| TiN | 0.2463 | 0.228938 | 0.17362 | +8 |

Examples 22 to 24

2.5 mm thick plaques were made from a composition comprising a selected inorganic material as an additive incorporated into a polymer and compared to plaques of the same dimensions made from the same polymer without the selected inorganic material and with no other material differences other than the lack of the additive. If the additive is incorporated during polymerisation, the comparison is made to a polymer made with the same recipe and polymerised under the same conditions but without the additive.

The plaques were then assessed using a Varian Cary 500 UV-VIS-NIR spectrophotometer and the % transmission at wavelengths between 400 nm and 550 nm; 700 nm and 1100 nm; and 700 to 1600 nm was recorded. These figures were then converted into absorbance by the equation Absorbance=−Log 10 (transmission %/100).

The absorbance of the additive (at each wavelength) was obtained by subtracting the absorbance of polymer containing the additive from the absorbance of the polymer without the additive.

The values for the maximum absorption between 400 nm and 550 nm (referred to hereinafter as ABS-1), for the maximum absorption between 700 to 1100 nm (referred to hereinafter as ABS-2) and for the maximum absorption between 700 to 1600 nm (referred to hereinafter as ABS-3) were determined by taking the maximum from each range. Then the ratios ABS-1/ABS-2; and ABS-1/ABS-3 were determined. Details on materials assessed and results are provided in the table below.

| Example No. | Details on additive | Resin | Ratio ABS-1/ABS-2 | Ratio ABS-1/ABS-3 |
|---|---|---|---|---|
| 22 | 10 ppm TiN (milled) | Untoned B60 | 0.42 | 0.42 |
| 23 | 100 ppm ITO | 9921W | 1.00 | 0.74 |
| 24 | 25 ppm LaB$_6$ | Untoned B60 | 0.54 | 0.54 |

Additionally, plaques prepared as described in Example 19 were tested as described for Examples 22 to 24 and found to perform in a similar manner.

The invention claimed is:

1. A container or a preform for a container, wherein said container or preform comprises a composition which comprises a polymeric material and an inorganic material selected from indium tin oxide, reduced indium tin oxide and antimony tin oxide.

2. A container or preform as claimed in claim 1, which includes at least 0.01 ppm and less than 1000 ppm of said inorganic material based on the weight of said polymeric material.

3. A container or preform as claimed in claim 1, wherein at least 90% of said inorganic material comprises particles having a maximum dimension which is less than 10 microns.

4. A container or preform as claimed in claim 1, wherein the inorganic material is colloidal or nanoparticulate matter.

5. A container or preform as claimed in claim 1, wherein the polymeric material is selected from one or more of the following polymers: polyesters, polycarbonates, polyamides, polyolefins, polystyrenes, vinyl polymers, acrylic polymers and copolymers and blends thereof.

6. A container or preform as claimed in claim 1, wherein said polymeric material comprises poly(ethylene terephthalate).

7. A container or preform as claimed in claim 1, wherein said container is stretch blow moulded.

8. A method of making a container, the method comprising:
(a) selecting a preform for a container wherein said preform comprises a composition which comprises a polymeric material and an inorganic material selected from indium tin oxide, reduced indium tin oxide and antimony tin oxide; and
(b) heating the selected preform and forming it into a container.

9. A method as claimed in claim 8, wherein, in said method, the composition is heated using an infrared source.

10. A method of improving the reheat characteristics of a polymeric material, the method comprising contacting the polymeric material or contacting one or more monomers or oligomers or prepolymers arranged to be polymerised to prepare the polymeric material with an inorganic material selected from indium tin oxide, reduced indium tin oxide and antimony tin oxide, wherein said inorganic material is dispersed in the polymeric material and said polymeric material includes at least 0.01 ppm and less than 1,000 ppm of said inorganic material based on the weight of said polymeric material.

11. A method according to claim 10, wherein granules or pellets which comprise the polymeric material and inorganic material are prepared.

12. A method according to claim 10, wherein said polymeric material comprises poly(ethylene terephthalate).

13. A method according to claim 10, wherein at least 90% of said inorganic material comprises particles having a maximum dimension which is less than 10 microns.

14. A composition with improved reheat characteristics, said composition comprising a polymeric material and an inorganic material dispersed in the polymeric material, wherein said composition includes at least 0.01 ppm and less than 1,000 ppm of said inorganic material based on the weight of said polymeric material; and wherein said inorganic material is selected from indium tin oxide, reduced indium tin oxide and antimony tin oxide.

15. A composition according to claim 14, wherein said polymeric material comprises poly(ethylene terephthalate).

16. A composition according to claim 14, wherein the inorganic material is colloidal or nanoparticulate matter.

17. A method of improving the reheat characteristics of a polymeric material, the method comprising contacting the polymeric material or contacting one or more monomers or oligomers or prepolymers arranged to be polymerised to prepare the polymeric material with an inorganic material selected from indium tin oxide, reduced indium tin oxide and antimony tin oxide, wherein granules or pellets which comprise the polymeric material and inorganic material are prepared.

* * * * *

UNITED STATES PATENT AND TRADEMARK OFFICE
CERTIFICATE OF CORRECTION

| | |
|---|---|
| PATENT NO. | : 8,211,983 B2 |
| APPLICATION NO. | : 12/888099 |
| DATED | : July 3, 2012 |
| INVENTOR(S) | : Anthony Jarvis, Mark Frost and Mark Rule |

Page 1 of 1

It is certified that error appears in the above-identified patent and that said Letters Patent is hereby corrected as shown below:

The following information was omitted. Please add on the cover page:

(22) PCT Filed:     March 30, 2005

(86) PCT No.:       PCT/GB2005/001231

Section 371(c)(1),
(2), (4) Date:      Dec. 21, 2006

(87) PCT Pub. No.:  WO2005/095516

PCT Pub. Date:      Oct. 13, 2005

(63) Related U.S. Application Data

Divisional of Application No. 10/599,403, filed on December 21, 2006, now Patent No. 7,820,781

(30)        Foreign Application Priority Data

Mar. 30, 2004  (GB)            0407114.8

Signed and Sealed this
Eighteenth Day of September, 2012

David J. Kappos
*Director of the United States Patent and Trademark Office*